July 19, 1932.  H. TIDWELL  1,867,780
WAVE MOTOR
Filed Aug. 18, 1930    2 Sheets-Sheet 1
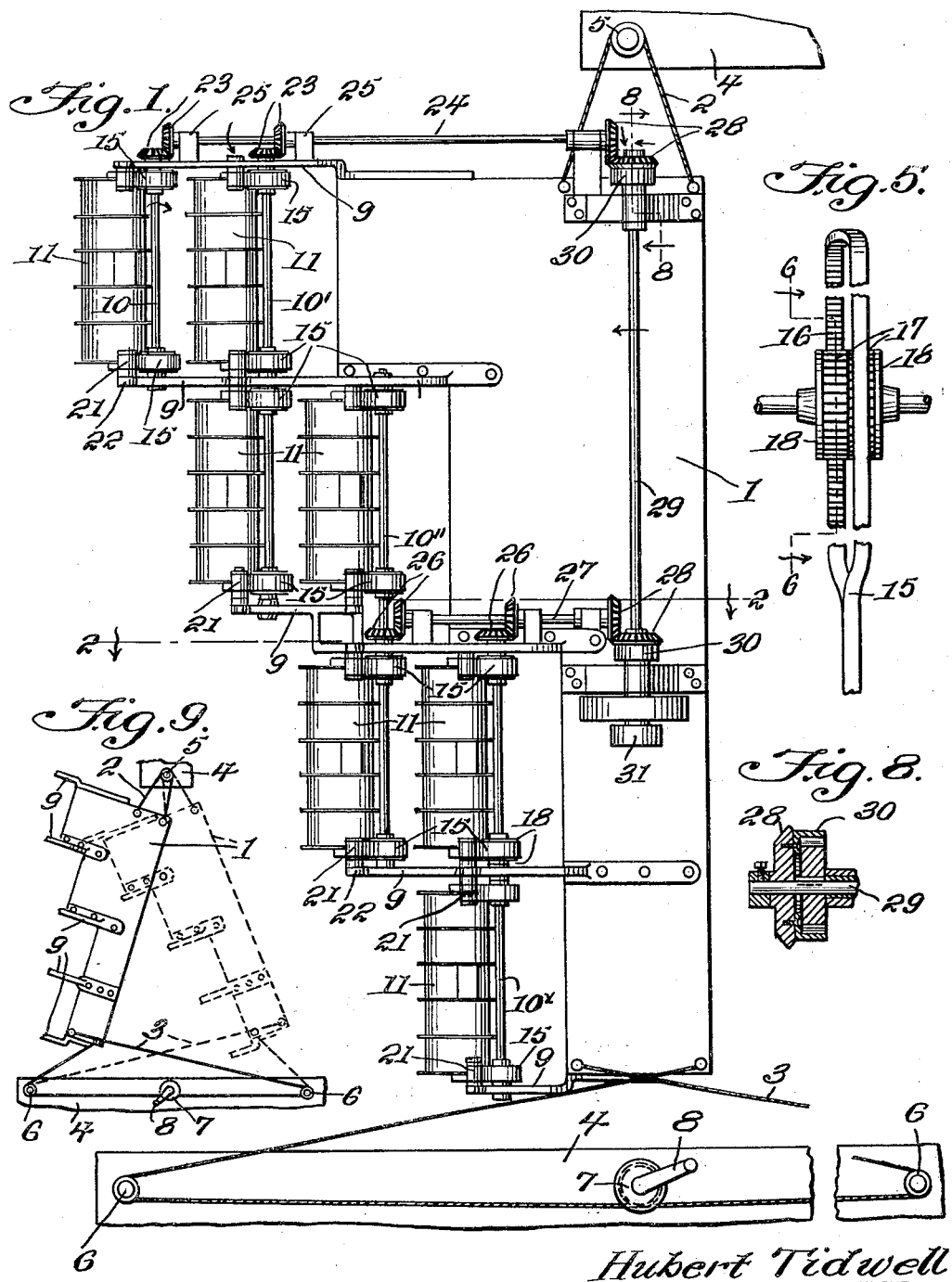

July 19, 1932.  H. TIDWELL  1,867,780
WAVE MOTOR
Filed Aug. 18, 1930  2 Sheets-Sheet 2
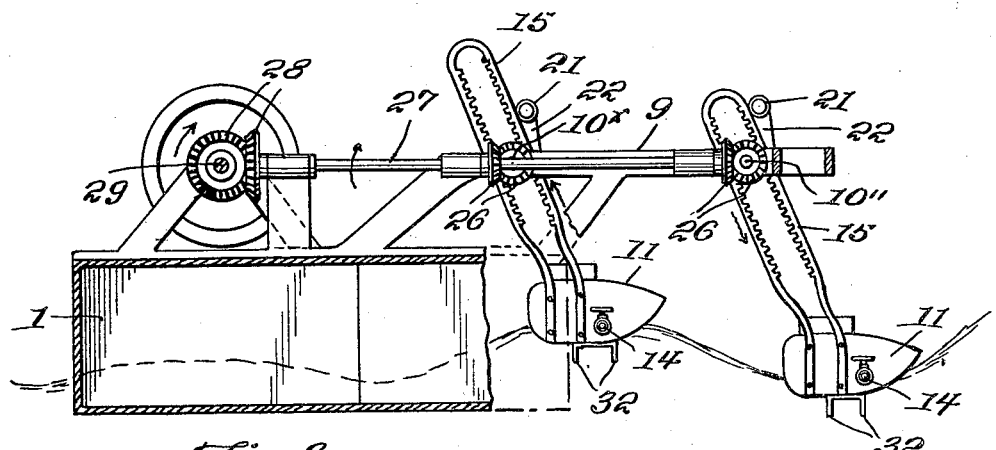
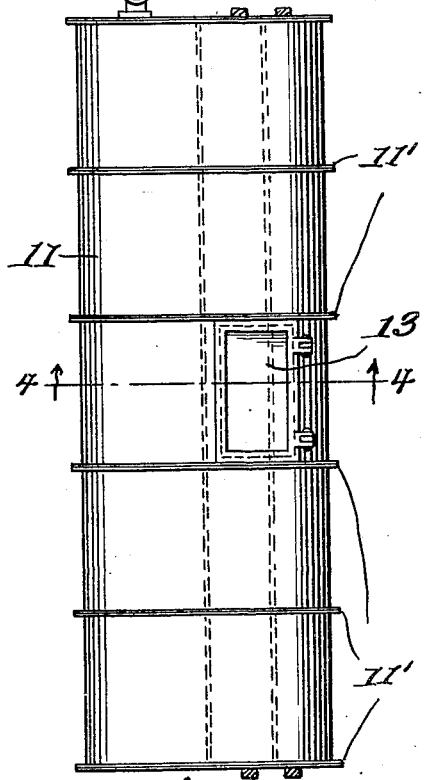
Hubert Tidwell
INVENTOR
BY Victor J. Evans
ATTORNEY
WITNESS: J. T. L. Wright Patented July 19, 1932

1,867,780

UNITED STATES PATENT OFFICE

HUBERT TIDWELL, OF GREEN RIVER, UTAH

WAVE MOTOR

Application filed August 18, 1930. Serial No. 476,167.

This invention relates to a wave motor, the general object of the invention being to provide a float having forwardly extending arms thereon for movably supporting a plurality of pontoons, with means for transmitting both the upward and downward movement of the pontoons to a shaft from which the power is taken, such transmitting means including over-run clutches and ratchet means so arranged that both the upward and downward movements of the pontoons are transmitted to the shaft and to prevent the movements of some of the pontoons from interfering with the transmission of the movements of other pontoons.

Another object of the invention is to provide means whereby the float can be moved to place the pontoons in the direction the waves are coming.

A further object of the invention is to provide means for admitting water to the pontoons when it is desired to weight the same, such for instance, as when the waves are of considerable height and it is desirable to limit the vertical motion of the pontoons.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 1 is a top plan view of the invention.

Figure 2 is a section on line 2—2 of Figure 1.

Figure 3 is a top plan view of one of the pontoons.

Figure 4 is a section on line 4—4 of Figure 3.

Figure 5 is an elevation of one of the ratchet means.

Figure 6 is a section on line 6—6 of Figure 5.

Figure 7 is a section on line 7—7 of Figure 6.

Figure 8 is a section on line 8—8 of Figure 1.

Figure 9 is a diagrammatic plan view showing how the float can be adjusted to position the pontoons according to the direction of the waves.

In these views, the numeral 1 indicates a float having its wave side stepped, as shown, with the ends of the float adjacent the shore side connected by the cables 2 and 3 with the stationary supports 4. The cable 2 has both ends connected with the float and said cable passes over a pulley 5 connected with the support 4 and the cable 3 passes over the forward and rearward pulleys 6 on the other supports 4 and is turned about the drum 7 which is provided with a handle 8. Thus by turning the drum, the cable 3 will move that end of the float to which it is attached either away from the shore or toward the shore, according to the direction the drum is turned, as shown in Figure 9, so as to place the stepped side of the float in the direction the waves are coming.

Forwardly extending arms 9 are connected with the stepped side of the float and a shaft 10 is journaled in that pair of the arms which are connected at one step of the float. A second shaft 10′ is journaled in the same pair of arms and extends to the next arm in which it is journaled, this shaft being placed inwardly of the shaft 10 at another step. A shaft 10″ is journaled in the three intermediate arms and is spaced inwardly from the shaft 10′ and a shaft 10$^x$ is journaled in the three arms which are connected at another step of the float so that the shafts are in echelon arrangement to confront the step.

The pontoons are shown at 11 and a pair of pontoons is associated with each pair of arms, except the outer pair of arms at one outermost step of the float, where one pontoon is arranged. Each pontoon is of an elongated form and has its front of substantially wedge shape and each pontoon is composed of a number of sections formed with flanges 11′ at their ends, with the flanges of the abutting sections suitably connected together. Each pontoon is also provided with a manhole 12 covered by a lid 13 and each pontoon is provided with a valve 14 so that by opening the valve, water will enter the pontoon to weight the same. This water can be pumped from the pontoon by opening the lid 3 and placing the end of the suction pipe of the pump into the pontoon. Of course, water can be removed from the pontoon in any other desired manner.

A loop-shaped arm 15 is fastened at its lower end to each end of each pontoon and the side portions of each arm are offset from each other and provided with the teeth 16 on their inner faces. The racks formed by the toothed portions of each arm engage the pair of sprockets 17 rotatably arranged between a pair of hub portions 18 on the before mentioned shafts and said shafts have keyed or otherwise fastened thereto the toothed members 19, one of which is arranged between each pair of hubs 18 and within each pair of sprockets. Rollers 20 are arranged in the spaces formed by the teeth of the member 19 and each sprocket 17. Thus the sprockets, the members 19 and the rollers form over-run clutches. As shown in Figure 1, the shaft 10 has one of these clutches at each end thereof and the other shafts which are journaled in three of the arms have two pairs of these sprockets thereon, one clutch being arranged adjacent each arm so that the racks of the arms of each pontoon will engage a pair of these clutches.

As will be seen, as the piston moves upwardly, one rack of each arm 15 thereof will turn one of the sprockets 17 of each pair of clutches associated with said pontoon and the other rack of each arm will turn the other sprocket of each clutch. Thus it will be seen that on the upward movement of each pontoon, the clutches will impart movement to the shaft from one pair of rack members, while the sprockets engaged by the second pair of racks are idling on the members 19. Then on the downward movement of the pontoon, the clutches will impart movement to the shaft from the second pair of racks, while the sprockets engaged by the first pair are idling on the members 19. The arms 15 extend upwardly and inwardly at an angle so that each pontoon is in advance of the shaft which it operates so as to facilitate the transmission of the motion of the pontoon to the shaft and swinging movement of the arms 15 is prevented by the rollers 21 carried by the uprights 22 on the arms 9 and engaging the forward sides of the arms 15.

The outer ends of the shafts 10 and 10' are connected by the gears 23 with a shaft 24 journaled in the brackets 25 connected with the long end of the float and the shafts 10'' and 10ˣ are connected by the gears 26 with a shaft 27 journaled in the float. The shafts 24 and 26 are connected by the gears 28 with a shaft 29 rotatably supported adjacent the short side of the float, the gears on said shaft 29 being connected with the shaft by the over-run clutches 30. The power is taken off of this shaft 29 in any desired manner, the drawings showing the shaft as being provided with a pulley 31 which may be connected by a belt to the mechanism to be driven by the movements of the pontoons.

Thus it will seen that both the upward and downward movement of the pontoons under the action of the waves will be transmitted to the shaft 29 by the combined ratchet means and over-run clutches and that the over-run clutches prevent a slower movement of one pontoon from interfering with the transmission of movement of a faster moving pontoon. The arrangement of the pontoons will cause them to reduce the height of the waves before such waves strike the float and the shape of the pontoons causes them to readily ride over the waves. In order to prevent the pontoons from riding down the rear part of a wave, I provide each pontoon with a pair of depending flanges 32, these flanges also acting to steady the pontoons in their vertical movement.

The stepped arrangement of the pontoons permits each wave to act on the forward pontoons at different times and the first pontoon of each set is acted on by the full force of the wave, while the second pontoon of each set is acted on by the wave after the same has acted on the first pontoon of the set.

As before stated, the float can be adjusted to place the pontoons in a position where they will receive the full force of the waves, irrespective of the direction of the waves.

Attention is called to the fact that by having the arms 15 extend upwardly and inwardly at an angle, the pontoons are permitted horizontal or lateral movement so that they will move horizontally with the waves and this horizontal motion will be transmitted to the device driven by the mechanism, so that power is secured both by the vertical movements of the pontoons and the horizontal or lateral movements thereof.

It is thought from the foregoing description that the advantages and novel features of the invention will be readily apparent. It is to be understood that changes may be made in the construction and in the combination and arrangement of the several parts, provided that such changes fall within the scope of the appended claims.

What I claim is:—

1. A wave motor of the kind described comprising stationary supports, a float having a stepped portion and adjustably connected to the supports, a plurality of pontoons arranged at the stepped portion and correspondingly thereto in échelon fashion, and means for transmitting up and down movement to the pontoons under the action of waves to mechanism to be actuated from said motor, said means including ratchet means and overrun clutches.

2. A wave motor of the kind described comprising stationary supports, a float having a stepped portion and adjustably connected to the supports, a plurality of pontoons arranged at the stepped portion and correspondingly thereto in échelon fashion, and means for transmitting up and down movement to the pontoons under the action of waves to mechanism to be actuated from said motor, said means including ratchet means and overrun clutches, said pontoons in their arrangement being located in the échelon fashion in pairs excepting at one end of the float.

3. A wave motor comprising stationary supports, a float having a stepped portion, means operable at one of the supports for adjusting the floats relative to said supports, a plurality of pontoons arranged in échelon at the stepped portion correspondingly thereto, a shaft on the float, means operable upon up and down movements of the pontoons and having connection with the shaft for transmitting motion therefrom to mechanism to be driven thereby.

4. A wave motor comprising stationary supports, a float having a stepped portion, means operable at one of the supports for adjusting the floats relative to said supports, a plurality of pontoons arranged in échelon at the stepped portion correspondingly thereto, a shaft on the float, means operable upon up and down movements of the pontoons and having connection with the shaft for transmitting motion therefrom to mechanism to be driven thereby, and means on the pontoons to permit admission of water thereto for varying the weights of said pontoons.

In testimony whereof I affix my signature.

HUBERT TIDWELL.